Feb. 8, 1966          C. T. JORGENSEN          3,233,722
                    PIANO TYPE CONVEYOR BELT
Filed Aug. 22, 1962                          2 Sheets-Sheet 1
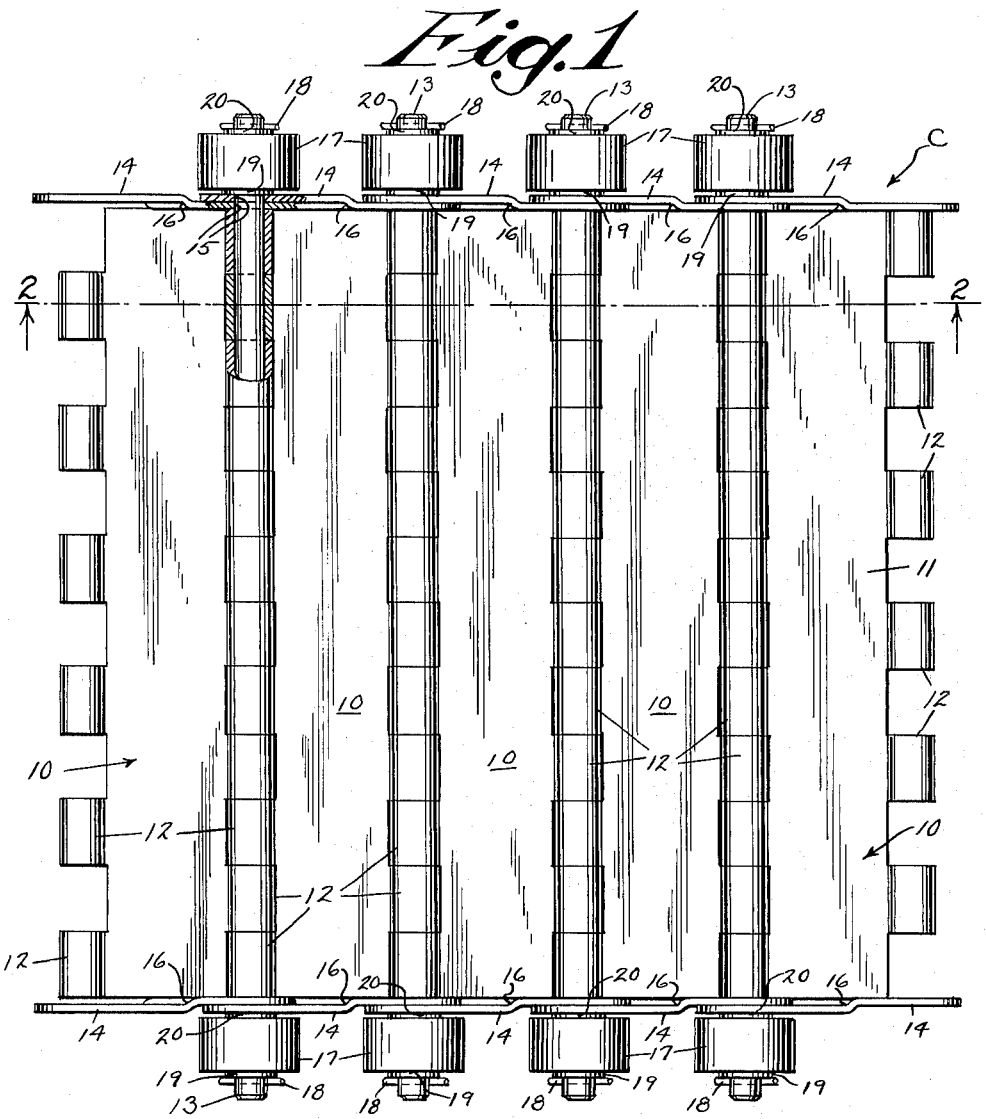
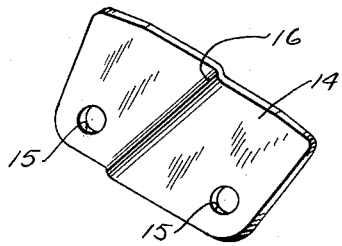
INVENTOR
CHARLES T. JORGENSEN
BY *Wright Wright*
ATTORNEYS

INVENTOR
CHARLES T. JORGENSEN

United States Patent Office 3,233,722
Patented Feb. 8, 1966

3,233,722
PIANO TYPE CONVEYOR BELT
Charles T. Jorgensen, 6208 N. 38th St., Milwaukee, Wis.
Filed Aug. 22, 1962, Ser. No. 218,624
2 Claims. (Cl. 198—196)

This invention appertains to conveyors and more particularly to endless metal conveyors of the hinged apron type.

Flexible metal apron conveyors are used for many purposes in the manufacturing and industrial fields, such as in moving sand and gravel, ores and other raw material, and machine parts being treated or processed. Such conveyors must be of a strong and rugged character and capable of flexing both up and down from the horizontal. Of necessity, such conveyors heretofore have been heavy and have an over-all width to correspond to the amount of material being handled. Side roller chains are provided embodying inner and outer side bars and material confining wings are welded, riveted or otherwise rigidly secured to the apron or section plates (see the Buck Patent No. 1,883,528 issued October 18, 1932). The side wings secured to the hinge sections or plates decrease the active width of the conveyor and consequently, the width of the conveyor has to be increased to carry a given amount of material. Likewise, inner and outer side bars for the roller chains increase the width of the conveyor. All of this adds to the cost and weight of the conveyor and the tracks and supporting structure therefor. As the wings are rigid with the plates or hinge sections such wings soon become bent and twisted from the material being dumped thereon and carried thereby. This presents difficulties, in that, movement of the overlapping portions of the wings becomes difficult or impossible resulting in the breaking down of the conveyor and the costly replacement of parts.

It is one of the primary objects of my invention to provide a strong and rugged flexible apron conveyor of a light weight and of a less over-all width of a given capacity than heretofore has been possible.

Another salient object of my invention is to provide a novel construction of material confining side wings and a novel means of flexibly connecting the wings together by pivotally carrying the wings directly on the hinge rods employed for connecting the apron plates or sections together, the construction being such that the wings are at the side edges of the plates or sections so as to not decrease the active load carrying width thereof and eliminate the necessity of welding or riveting the wings on the apron sections or plates.

Another prime object of the invention is to so mount the wings on the hinge rods and relative to the apron plates or sections that the same will effectively function as inner side bars for the roller chains, thereby eliminating the cost, width and thickness of such additional inner side bars.

A further important object of the invention is to provide the wings with offset portions for facilitating overlapping and mating of adjacent combined side wings and inner chain bars with the offset portions formed by diagonally extending bends for reinforcing the wings and for resisting longitudinal chain pulls, which tend to straighten or distort bends formed by straight transverse lines.

Another further important object of the invention is to provide outer chain bars of the same construction as the combined wings and inner bars to gain the advantages thereof, and whereby the outer bars can be formed on the same dies as the combined wings and inner bars.

A still further important object of my invention is to provide novel inter-fitting hinge barrels or loops on the apron sections or plates for receiving the hinge rods, so that the hinge barrels or loops will project a greater distance above the upper surface of the plates than the lower surface, so as to form a pan effect or raised cleats for engaging the material to prevent slipping thereof incident to the travel of the conveyor up or down inclines, the hinge barrels or loops functioning to give a strong and rugged construction.

With these and other objects in view, the invention consists in the novel construction, arrangement and formation of parts, as will be hereinafter more specifically described and claimed and illustrated in the accompanying drawings, in which drawings, FIGURE 1 is a fragmentary top plan view of my novel flexible metal apron conveyor belt;

FIGURE 5 is a perspective view of one of my novel combined side wings and inner chain links.

Referring to the drawings in detail, wherein similar reference characters designate corresponding parts throughout the several views, the letter C generally indicates my novel flexible apron conveyor.

Figure 2:
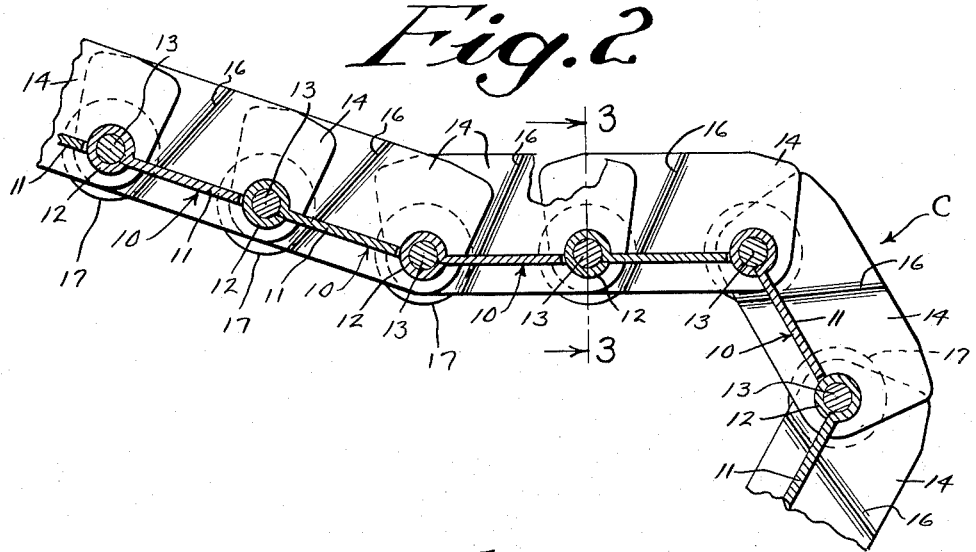
FIGURE 2 is a longitudinal sectional view through my conveyor illustrating the flexibility thereof in conforming to inclines up and down from the horizontal, the section being taken on the line 2—2 of FIGURE 1, looking in the direction of the arrows, the view also showing the novel pan effect of the conveyor formed by the position of the hinge barrels or loops.
Figure 3:
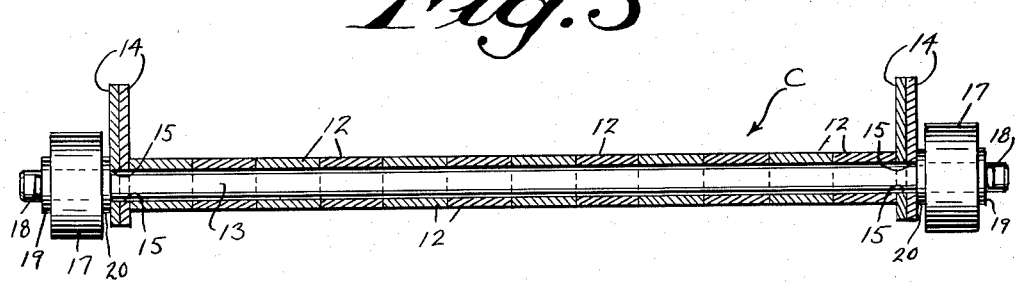
FIGURE 3 is a transverse sectional view through the conveyor taken on the line 3—3 of FIGURE 2, looking in the direction of the arrows.

The conveyor C includes a plurality of like conveyor sections or plates 10. The plates can be formed from any desired type of material and gauge of material suitable for the type of material being carried by the conveyor. Each plate or conveyor section 10 includes an elongated flat body 11 and this flat body has formed on its opposite side edges staggeredly arranged hinge barrels or loops 12. These loops or barrels, as stated, are staggeredly arranged on their opposite edges to permit the inter-fitting thereof with adjacent plates or sections and for receiving the transversely extending hinge rod or shaft 13. The rods or shafts 13 protrude a considerable distance beyond the opposite edges of the plates or sections for a purpose, which will later appear.

Particular attention is directed to the hinge barrels or loops 12 and it is to be noted that the same are formed by rolling back portions of the side edges of the plates or sections. In the rolling back of the material, the ends of the loops or barrels preferably abut or closely engage the lower surface of a plate. These barrels or loops 12 extend a considerable distance above the upper surface of the plates and at a much greater distance above the plates than the lower surface of the plates. Thus each plate or section forms in effect, a pan for carrying material or the raised loops or hinge barrels form transversely extending cleats for engaging the material and for preventing the sliding back of the same while the belt is travelling up or down inclines. Hence, it can be seen that the loops are offset and that the terminal portions of the loops which engage the bottom surfaces of the plates are below the center line of the hinge rods or shafts 13. This increases the strength of the loops or barrels and eliminates a direct pull on the center line of the barrels. In other words, the pull is above the portions of the barrels which abut the lower surface of the plates and this decreases the tendency of the barrels to open up. The arrangement of the barrels is such that there is a close fit between the plates or conveyor sections so as to eliminate the sifting of granular material through the belt.

In order to prevent material being carried by the conveyor from dropping off the sides of the belt, I employ material confining side wings 14. There is a wing 14 for each side of a plate 10 and each wing 14 can be stamped or otherwise formed from a flat plate. The lower corners of each wing 14 are provided with bearing openings 15 and the wings are slipped over the portions of the hinge rods 14 which project beyond the side edges of the plates. Thus these wings are carried directly by the hinge rods 13 and move on the rods. Hence, the wings are positioned at the side edges of the conveyor sections or plates and the entire upper surface of these plates form means for carrying the material and the wings do not decrease the active width of the conveyor. In order to strengthen the wings and to facilitate the movement of the wings relative to one another and to provide a close fit between the wings and side edges of the conveyor each wing is provided with a diagonally extending bend 16 to divide each wing into offset portions. This facilitates the overlapping of the wings and brings about the desired close fit. The bend 16 extends diagonally across each wing and at an angle compatible with the shape of the ends of the wings. Thus during flexing of the conveyor up and down the overlapping portions of the wings close up gaps at critical points where material may shift on the belt. Having the bends 16 at an angle instead of extending transversely across a wing, gives greater length of surface that will resist force tending to stretch out the wings. The bend being in the direction of pull also decreases the likelihood of the wings becoming distorted. The overlapping of the wings and position thereof during travel in different planes is best shown in FIGURE 2 and the inclined bends give ample room for the proper swinging of the wings during inclined travel.

The hinge rods 13 rotatably carry track engaging rollers 17 and these rollers can be held on the hinge rods by the use of cotter pins 18. Wear washers 19 and 20 can also be placed on the hinge rods and interposed between the cotter pins 18 and side wings 14.

Figure 4:
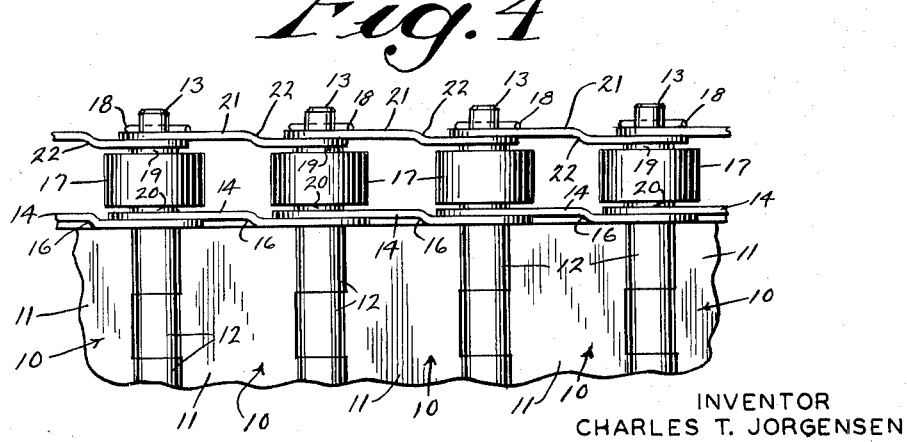
FIGURE 4 is a fragmentary top plan view of my novel conveyor with outer side bars connected thereto to form out side chains.

In FIGURE 4 I have shown the conveyor provided with complete side chains and the complete side chains are formed by merely providing outer side links or bars 21. The wings 14 constitute inner links or bars of the chain and hence the necessity for additional inner chain links or bars is eliminated. The outer side bars 21 of the chain are formed in the same manner as the wings 14 and hence these side bars or links at their lower corners are provided with bearing openings for mounting on the hinge rods 13 and are provided with diagonally extending bends 22. The bends 22 in the side bars or links are in the same position as the bends on the side wings and hence complete flexibility is insured. FIGURE 4 also clearly shows the overlapping of the outer side bars or links 21.

With the outer side bars or links 21 bent at the same location and angle as the bend in the side wings 14, a saving is effected, in that, the same dies and tooling are used to produce both the wings and outside links or bars.

From the foregoing description, it can be seen that I have provided an exceptionally strong and durable apron type of metal conveyor in which weight and over-all width are saved, with an advantage of extreme flexibility for moving in inclined planes up or down from the horizontal.

Changes in details may be made without departing from the spirit or the scope of this invention, but what I claim as new is:

1. In a conveyor, a metal apron conveyor belt comprising a plurality of conveyor plate sections, hinge loops carried by the sides of said sections with the loops of adjacent sections in transverse alignment, hinge rods extending through said loops, material confining side wings disposed beyond the end edges of said plate sections but in engagement with said end edges, said wings having their lower corners provided with bearing openings receiving said hinge rods, each of said wings including offset portions with the offset portions overlapping adjacent wings, said offsets of the wings being formed by diagonally extending bends in said wings, the wings being movable on the hinge rods and relative to one another to permit flexing of the belt in reverse curves and inclines.

2. In a conveyor, a metal apron conveyor belt comprising a pluarilty of conveyor plate sections, each of said sections having hinge loops on its opposite side edges with the loops staggeredly arranged whereby loops of adjacent plate sections will inter-fit. hinge rods extending through said inter-fitting loops, the hinge rods extending a material distance beyond the sides of the belt, rollers rotatably mounted on the rods, outer chain bars having their ends overlapped and mounted upon the hinge rods, combined material confining wings and inner chain bars having their terminals in overlapped relation and rockably mounted upon said rods, said wings extending a material distance above the upper surface of the plates, said outer chain bars and said inner combined material confining wings and chain bars being offset to provide the overlapping portions, and said offset portions of the outer chain bars and inner combined wings and chain bars being defined by diagonally extending bends.

References Cited by the Examiner

UNITED STATES PATENTS

| 2,416,634 | 2/1947 | McBride | 198—196 |
| 2,725,975 | 12/1955 | Franz | 198—196 |
| 2,950,000 | 4/1960 | Rivers | 198—196 |

SAMUEL F. COLEMAN, *Primary Examiner.*

WILLIAM B. LABORDE, *Examiner.*